United States Patent [19] [11] 3,938,627
Nagazumi [45] Feb. 17, 1976

[54] MECHANICAL ENERGY ABSORBING DEVICE AND SAFETY HARNESS USING THE SAME

[75] Inventor: Yasuo Nagazumi, Tokyo, Japan

[73] Assignee: Nissan Motor Company Limited, Yokohama, Japan

[22] Filed: Jan. 24, 1975

[21] Appl. No.: 543,944

Related U.S. Application Data

[63] Continuation of Ser. No. 323,262, Jan. 12, 1973.

[30] Foreign Application Priority Data
Jan. 12, 1972 Japan ............................ 47-6710[U]
Jan. 12, 1972 Japan ............................ 47-6711[U]
Jan. 12, 1972 Japan ............................ 47-6712[U]

[52] U.S. Cl. ............ 188/1 C; 280/150 SB; 297/386
[51] Int. Cl.² ............................................ F16F 7/12
[58] Field of Search ............. 74/492; 188/1 B, 1 C; 280/150 SB; 297/386

[56] References Cited
UNITED STATES PATENTS
3,504,567 4/1970 Ohashi et al. ................... 188/1 C X FOREIGN PATENTS OR APPLICATIONS
1,109,578 9/1955 France ............................... 188/1 C Primary Examiner—Duane A. Reger

[57] ABSTRACT

An improved mechanical energy absorbing device is herein disclosed which includes an elongated member plastically deformable in a longitudinal direction when subjected to a mechanical force greater than an elastic limit of the member in the longitudinal direction so that the mechanical energy applied to the device is at least partly consumed in the plastic deformation of the elongated member. A typical application of the energy absorbing device is a safety harness for a seat of a motor vehicle or air plane although the device may lend itself to various other practical purposes.

2 Claims, 23 Drawing Figures

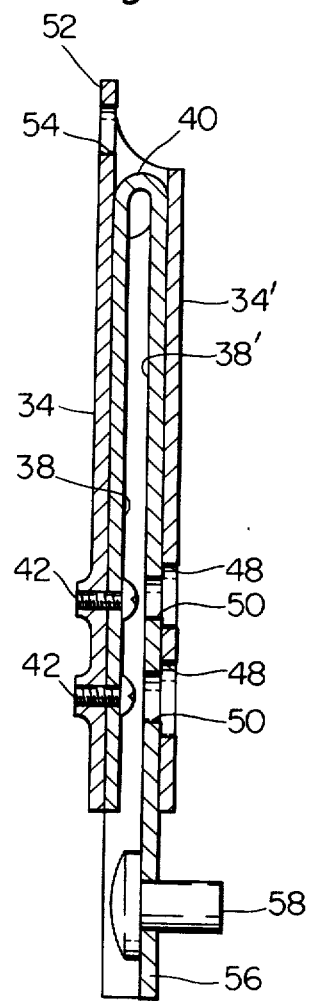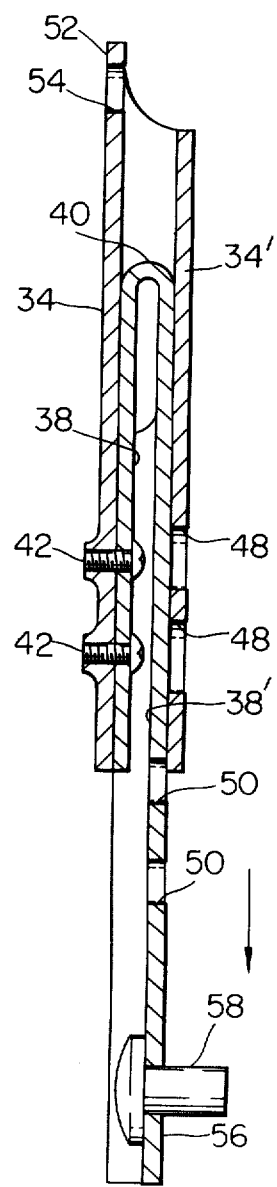

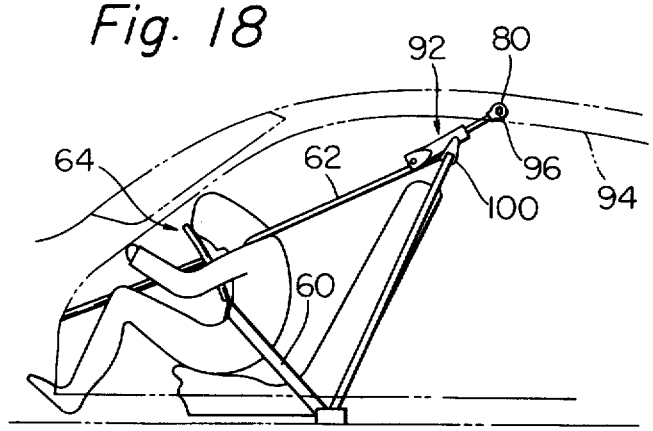
Fig. 18
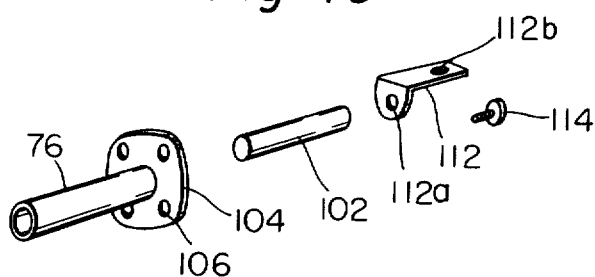
Fig. 19
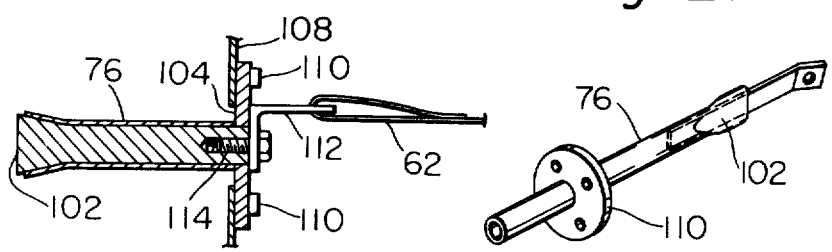
Fig. 20
Fig. 21

MECHANICAL ENERGY ABSORBING DEVICE AND SAFETY HARNESS USING THE SAME

This is a continuation of application Ser. No. 323,262, filed Jan. 12, 1973.

The present invention relates generally to devices adapted to absorb mechanical energy. While the mechanical energy absorbing device herein disclosed may be advantageously utilized for various other purposes, the device is especially useful when incorporated in a safety harness for an occupant of a seat of, for example, a motor vehicle or air plane for holding and restraining the seat occupant from being flung forward or injured in the event of a collision of excessive deceleration of the motor vehicle or air plane.

It is presently commonplace in aircraft, certain types and uses of motor vehicles and other power driven vehicles to provide for some sort of restraint for the seat occupants so that the occupants are protected from striking against the wind-shields, steering wheels or control columns, instrument panels or other structural parts of the vehicles in case of collisions or abrupt deceleration conditions. The safety harness is adapted to provide such restraint for the seat occupant and usually takes the form of a seat belt or a shoulder strap or a combination of the two by which the occupant subjected in a sudden deceleration is yieldably held and restrained. While the safety harness using the seat belt and/or shoulder strap has been effective for certain types of relatively minor decelerations of the vehicle, the safety harness has proved deficient with the higher decelerations as experienced in many of the serious collision conditions. This known ineffectiveness has its rise, at least partially, in the deficient energy absorption efficiency of the seat belt or shoulder strap which is adapted to absorb the kinetic energy through its forced elongation. Because, moreover, of the fact that such elongation of the yieldable seat belt shoulder strap is brought about at an appreciably retarded timing from the instant at which the impact is imparted to the seat occupant, the safety harness of the prior art character hardly lends itself to protection of the occupant at an incipient stage of the collision condition or abrupt deceleration. By reason of these drawbacks, the safety harnesses of the known characters have failed to provide sufficient reliability in protecting the occupants of the seat during the collision or sudden stoppage of the vehicles.

It is, therefore, an important object of the present invention to provide an energy absorbing device which features an increased energy absorption efficiency.

It is another important object of the invention to provide an energy absorbing device which is rapidly responsive to application of a mechanical force greater than a predetermined level.

Yet, it is another important object of the invention to provide an improved safety harness using an energy absorption efficiency and which is capable of responding to mechanical energy at a proper timing during an abrupt deceleration condition as encountered in the event of a collision.

The energy absorbing device to accomplish these and other objects of the present invention basically comprises an elongated member which is plastically deformable when subjected to a mechanical force greater than an elastic limit of the member so that the mechanical energy imparted to the device is at least partly consumed in the plastic deformation of the member.

Where the energy absorbing device of this nature is to be incorporated particularly in the safety harness of the described character, the deformable member of the device should be connected at one end to any stationary structural member of on which the seat is fast and at the other end to an elongated yieldable member such as a seat belt or shoulder strap of the safety harness directly or through suitable fastening means. If desired, however, the deformable member may be connected directly or through the suitable fastening means between two separate elongated yieldable members which are anchored to structural members on which the seat is fast.

The mechanical energy absorbing device of the general configuration above described may comprise, in one preferred form, a pair of spaced, substantially parallel, rigid outer members which are rigidly connected to each other for defining an elongated space therebetween and an elongated inner member which has a first longitudinal portion received on an inner face of one of the outer members and secured at its end to the inner face of the outer member and a second longitudinal portion at least partly received on an inner face of the other of the outer members, merging from the first longitudinal portion through a return-end portion between the outer members and opposite to the end of the first longitudinal portion and extending substantially in parallel to and at a substantial spacing from the first longitudinal portion. Thus, the inner member is plastically deformable in a longitudinal direction when subjected to a mechanical force greater than an elastic limit thereof substantially in the longitudinal direction of the inner member. Where the energy absorbing device of this construction is used in the safety harness, the inner member may include an extension extending outwardly from the outer members opposite to the return-end portion thereof. In this instance, the second longitudinal portion of the inner member is connected through its rigid connection with the outer member to either of the yieldable member of the safety harness and the stationary structural member and through the extension to the other of the structural and yieldable members. When, thus, a mechanical force is imparted to the energy absorbing device, then the second portion of the inner member is longitudinally moved relative to the first longitudinal portion of the member with the return-end portion being continuously plastically deformed and moved from its initial position whereupon a major portion of the mechanical energy applied to the device is consumed in the plastic deformation of the inner member.

The mechanical energy absorbing device according to the present invention may comprise, in another preferred form, a hollow elongated outer member and an elongated inner member which is at least partly fitted into the outer member. The outer and inner members have first longitudinal portions which are coextensive with each other and second longitudinal portions which merge from the first longitudinal portions and have cross sections which are different from cross sections of the first longitudinal portions. Where the energy absorbing device of this construction is to be incorporated in the safety harness of the described nature, the inner and outer members are connected at their opposite ends between the yieldable member of the safety harness and the stationary structural member on which the seat is fast. When, thus, the energy absorbing deice of the construction above described is subjected to a mechanical force, then the outer and inner members are longitudinally moved relative to each other so that the first longitudinal portion of the inner member is forced into the second longitudinal portion of the outer member whereby the first longitudinal portion of the inner member and/or the second longitudinal portion of the outer member is plastically deformed to have a cross section which is substantially identical with the second longitudinal portion of the inner member and/or the first longitudinal portion of the outer member, respectively. Thus, either or both of the outer and inner members may be deformable through selection of the material or materials and thicknesses of the outer and inner members. Where the inner member is less rigid than the outer member, the former will be deformable so that the first longitudinal portion of the inner member is plastically deformed to have a cross section which is substantially identical with the cross section of the second longitudinal portion of the inner member when the first longitudinal portion of the inner member is forced into the second longitudinal portion of the outer member. Where, conversely, the outer member is less rigid than the inner member, the former will be deformable so that the second longitudinal portion of the outer member is plastically deformed to have a cross section of the first longitudinal portion of the outer member. Where, moreover, the outer and inner portions are similarly rigid and accordingly both of the members are plastically deformable, both the first longitudinal portion of the inner member and the second longitudinal portion of the outer member will be deformed to have cross sections substantially identical with the second longitudinal portion of the inner member and the first longitudinal portion of the outer member, respectively.

While the embodiments of the mechanical energy absorbine device above described are adapted to consume the mechanical energy by the plastic deformation of the deformable member of members, the energy absorbing device according to the present invention may be so arranged that the mechanical energy imparted to the device is consumed by not only the plastic deformation of a member but the shear of the member from a member integrally formed therewith. For this purpose, the mechanical energy absorbing device may comprise, in still another preferred form, a generally elongated structure having a pair of spaced parallel elongated wall portions which merge into each other through a return-end portion and which are plastically deformable and shearable from the structure when subjected to a mechanical force greater than a breaking strength of the wall portions in the longitudinal direction. Where the mechanical energy absorbing device of this particular construction is used in the safety harness of the described nature, one of the two deformable and shearable wall portions of the device may have an extension projecting longitudinally away from the other wall portion. In this instance, the structure of the device may be connected between the stationary structural member and the yieldable member of the safety harness through the extension of the deformable and shearable wall portion and through any portion of the structure adjacent the wall portions. When, now, the mechanical energy absorbing having the construction above described is subjected to a mechanical force in a longitudinal direction, then one of the deformable and shearable members of the structure is forced and torn apart from the structure substantially at the return-end portion and simultaneously the return-end portion is caused to continuously plastically deform. The energy of the mechanical force applied to the device is in this manner consumed partly by the shearing of the wall portion from the structure and partly by the plastic deformation of the return-end portion. To aid in the shearing of the wall portion from the structure, suitable stress rising means may be located at the return-end portion of the structure in an initial condition. The stress rising means may be provided by forming notches or holes at both side ends of the return-end portion.

The natures and advantages of the mechanical energy absorbing device and the safety harness using the energy absorbing device will become more apparent from the following description taken in conjunction with the accompanying drawings in which:

FIG. 3 is a longitudinal sectional view showing the mechanical energy absorbing device assembled from the casing and deformable members illustrated in FIGS. 1 and 2, respectively;

FIG. 4 is also a longitudinal sectional view of the mechanical energy absorbing device in an operative condition;

FIG. 18 is a schematic side end view of the safety harness in an operative condition;

FIG. 19 is an exploded perspective view showing another modification of the mechanical energy absorbing device shown in FIGS. 9 to 11;

FIG. 20 is a longitudinal sectional view showing the energy absorbing device illustrated in FIG. 19;

FIG. 21 is a perspective view showing still another modification of the mechanical energy absorbing device illustrated in FIGS. 9 to 11;

Figure 1:
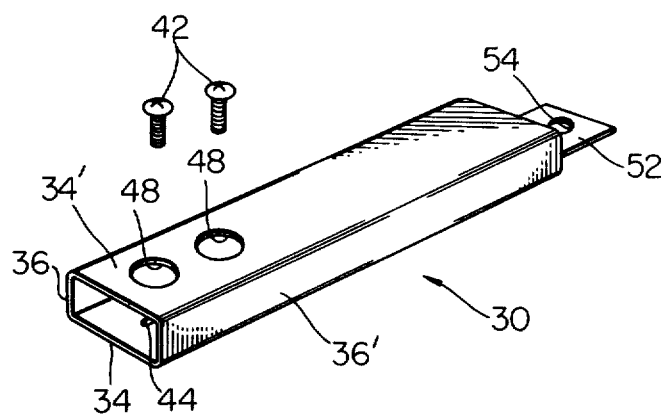
FIG. 1 is a perspective view showing a casing member which is to form part of a preferred embodiment of the mechanical energy absorbing device according to the present invention.
Figure 2:
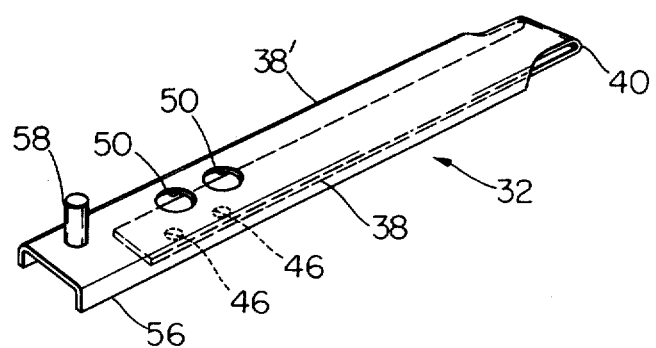
FIG. 2 is also a perspective view showing a deformable member to be combined with the casing member shown in FIG. 1 in the first embodiment.

Reference will now be made to the drawings, first concurrently to FIGS. 1 to 3 which show a first preferred embodiment of the mechanical energy absorbing device according to the present invention. An illustrated therein, the mechanical energy absorbing device of the first preferred form largely comprises an elongated casing 30 and an elongated deformable member 32. The casing 30 is constructed sufficiently rigidly, formed of a rigid material and/or having a considerably large thickness. The deformable member 32, on the other hand, is formed of such a material and/or has such a thickness as to be plastically deformable in a longitudinal direction when subjected to a mechanical force greater than an elastic limit of the member in the longitudinal direction. The casing 30 is made up of first and second guide members 34 and 34', respectively, which are spaced apart from and substantially in parallel to each other so that an elongated space is defined therebetween. These first and second guide members 34 and 34', respectively, are rigidly secured to each other by a pair of spaced parallel side members 36 and 36' which are edgewise connected to or integral with the guide members 34 and 34'. The casing 30 is usually a unitary structure having the members 34, 34', 36 and 36' integral with each other as seen in FIG. 1. The deformable member 32 has a first longitudinal portion 38 which is received on an inner face of the first guide member 34 of the casing 30 and a longitudinal second portion 38' which is received on an inner face of the other guide member 34' as seen in FIG. 3. These first and second longitudinal portions 38 and 38', respectively, merge into each other through a substantially curved return-end portion 40 which is located between end portions of the guide members 34 and 34'. The first longitudinal portion 38 of the deformable member 32 is rigidly connected at its end portion remote from the return-end portion 40 to the adjacent end portion of the first guide member 34 of the casing 30 by bolts 42 which are screwed into the portion 38 and member 34 through internally threaded holes 44 formed in the guide member 34 and holes 46 formed in the portion 38 of the deformable member 32 as seen in FIGS. 1 and 2. For the purpose of bolting the deformable member 32 to the inner face of the casing 30 during assemblage, the second guide member 34' of the casing 30 and the second longitudinal portion 38' of the deformable member 32 are formed with openings 48 and 50, respectively, which are so located as to be in alignment with the holes 44 and 46 for providing easy access to the holes 44 and 46.

Where the mechanical energy absorbing device having the construction above described is to be incorporated in a safety harness for a seat of a motor vehicle or air plane as previously mentioned, the device is connected intermediate between an elongated yieldable member such as a seat belt or a shoulder strap of the safety harness and a suitable stationary member or structure on which the seat is fast. For this purpose, one of the guide members 34 and 34', which one may be the first guide member 34 as shown, has a longitudinal extension 52 which is formed with an opening 54 through which the casing 30 may be rigidly connected to a structural member of a vehicle body, for example. The second portion 38' of the deformable member 32, on the other hand, has a longitudinal extension 56 projecting outwardly from the casing 30 opposite to the extension 52. The longitudinal extension 56 of the deformable member 32 thus formed is connected to the seat belt or shoulder strap (not shown) of the safety harness through, for example, a stud 58 fitted into the extension 56 as seen in FIGS. 1 and 3.

When, now, the mechanical energy absorbing device above described is subjected to a mechanical force in a longitudinal direction so that a pull is longitudinally imparted to the casing 30 and deformable member 32, then the deformable member 32 will be longitudinally locally moved relative to the casing 30 in a direction of arrow as indicated in FIG. 4. The second longitudinal portion 38' of the deformable member 32 is thus forced away from the casing 30 with the return-end portion 40 continuously plastically deformed and moved away from its initial position. viz., toward the bolts 42 when the mechanical force applied to the deformable member 32 is greater than the elastic limit of the member. As a consequence, the mechanical energy exerted on the device in its entirety is consumed partly but in major proportion in the plastic deformation of the deformable member 32 and partly in the production of heat resulting from the friction between the moving portion of the member 32 and the second guide member 34'.

Figure 5:
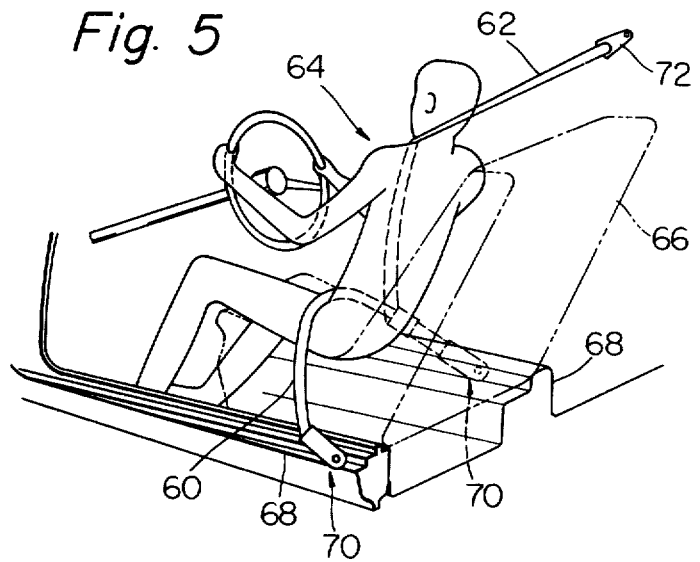
FIG. 5 is a schematic perspective view showing an example of the safety harness using the mechanical energy absorbing device of the construction illustrated in FIGS. 1 to 4, the safety harness being assumed to be incorporated in a motor vehicle and shown as being in an inoperative condition.

FIG. 5 illustrates an example of the safety harness using the mechanical energy absorbing device of the nature above described wherein the safety harnes is exemplified as being incorporated in a motor vehicle for the protection of the vehicle occupant from incurring an injury in the event of a frontal collision of the motor vehicle.

Figure 6:
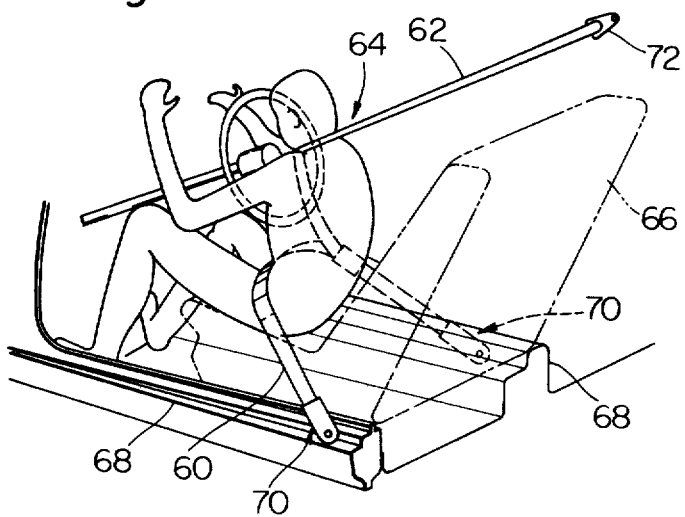
FIG. 6 is a schematic perspective view showing an operative condition of the safety harness illustrated in FIG. 5.

Referring to FIG. 5, the safety harness largely comprises a seat belt 60 and a shoulder strap 62 for preventing a vehicle occupant 64 on a seat 66 from being violently flung when a frontal collision is encountered by the motor vehicle. The seat belt 60 is shown as being connected to seat frames 68 through the mechanical energy absorbing devices, designated by reference numeral 70, of the construction above described. The shoulder strap 62, on the other hand, is anchored at one end to a ceiling (not shown) of the vehicle body through a suitable metal fitting 72 and connected at the other to an intermediate portion of the seat belt 60. Referring concurrently to FIGS. 1 to 5, each of the mechanical energy absorbing devices 70 is connected to the seat frame 68 through the opening 54 formed in the longitudinal extension 52 of the first guide member 34 of the casing 30 and to an end portion of the seat belt 60 through the stud 58 on the longitudinal extension 56 of the second longitudinal portion 38' of the deformable member 32. When, thus, the motor vehicle encounters a collision at the front and accordingly the vehicle occupant 64 is forced forward as seen in FIG. 6, then the seat belt 60 and the shoulder strap 62 will be elongated so as to dampen a kinetic energy transferred thereto from the vehicle occupant 64 which a mechanical force is also imparted to the energy absorbing devices 70 through the seat belt 60. If, under this condition, the mechanical force applied to the energy absorbing devices 70 is of the order greater than the elastic limit of the deformable members 32 of the energy absorbing devices, the second portions 38' of the deformable members 32 are forcibly drawn out of the casings 30 so that the remaining kinetic energy on the seat belt 60 and shoulder strap 62 is consumed partly in the plastic deformation of the deformable members 32 and the frictional heat produced between the deformable members 32 and the casings 30 as previously discussed.

Figure 7:
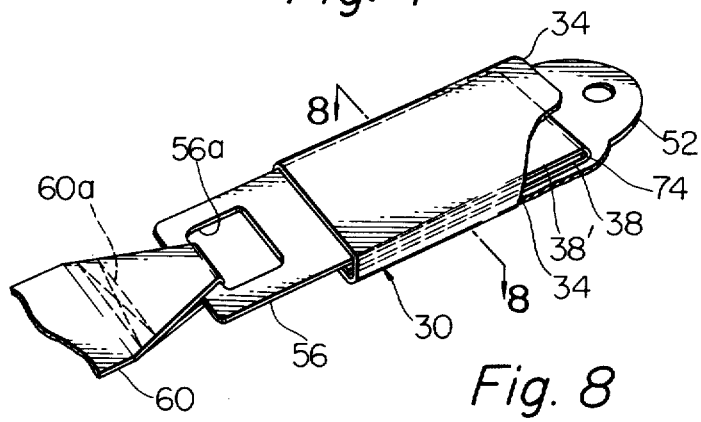
FIG. 7 is a perspective view of a modification of the mechanical energy absorbing device of the construction shown in FIGS. 1 to 4.
Figure 8:
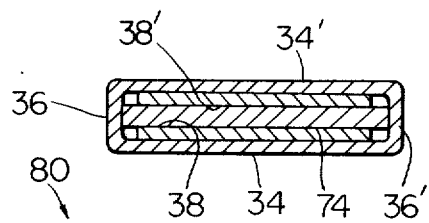
FIG. 8 is a cross sectional view taken on line 8—8 of FIG. 7.

FIGS. 7 and 8 illustrate a modification of the mechanical energy absorbing device of the construction shown in FIGS. 1 to 3. Referring to FIGS. 7 and 8, the modified mechanical energy absorbing device includes a spacer strip 74 which is interposed between the first and second longitudinal portions 38 and 38', respectively, of the deformable member 32. The spacer strip 74, preferably formed of plastics, lends itself to preventing the deformable member 32 from being buckled or warped when the second portion 38' of the deformable member 32 happens to undergo a compressive force in the longitudinal direction. The spacer strip 74 of this nature will further serve the purpose of reducing the friction between the moving portion of the deformable member 32 and the inner face of the second guide member 34' when the deformable member is deformed in response to a mechanical force applied thereto. The second longitudinal portion 38' of the deformable member 32 is herein shown as having a longitudinal extension 56 which is now formed with an opening or slot 56a. The deformable member 32 is thus connected to the seat belt 60 through this slot 56a and a loop portion of the belt 60 which is stitched as at 60a where the shown energy absorbing device is used as part of a safety harness of the character illustrated in FIGS. 5 and 6. Although only one spacer strip 74 is shown to be used in the embodiment above described, such is merely by way of example and, thus, any desired number of spacer strips may be interposed between the spaced first and second portions of the deformable member.

The features of the embodiments of the mechanical energy absorbing device above described include, in addition to the increased energy absorption efficiency and the capability of responding to an impact at an incipient stage of application of the impact, an extremely simple construction which consists essentially of the members of panel forms. Since the mechanical energy absorbing device is thus made up practically only of the panels, the device can be manufactured at a significantly low cost and the thickness of the device as a whole can be reduced so as to lessen the space requirement of the device.

FIGS. 9 to 12 illustrate another preferred embodiment of the mechanical energy absorbing device in accordance with the present invention. The embodiment herein shown is also adapted to convert the kinetic energy applied thereto into an energy of deformation of a deformable member.

Figure 9:
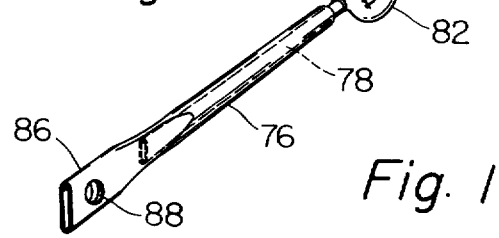
FIG. 9 is a perspective view showing another preferred embodiment of the mechanical energy absorbing device according to the present invention.
Figure 10:
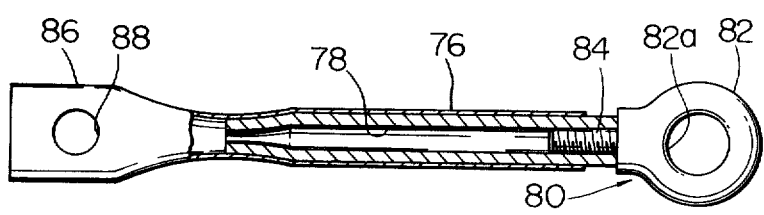
FIG. 10 is a longitudinal sectional view of the energy absorbing device illustrated in FIG. 9.
Figure 11:
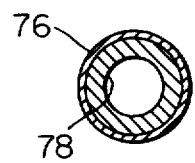
FIG. 11 is a section on line 11—11 of FIG. 10.
Figure 12:
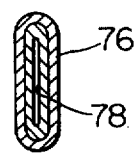
FIG. 12 is a section on line 12—12 of FIG. 10.

Referring first to FIGS. 9 to 12, the mechanical energy absorbing device of the shown construction comprises an outer tubular member 76 and an inner tubular member 78 which is tightly fitted into the outer tubular member 76. The outer and inner tubular members 76 and 78, respectively, include first longitudinal portions which have circular cross sections as seen in FIG. 11 and second longitudinal portions which are flattened are gradually flattened toward their ends from the first longitudinal portions as seen in FIG. 12. An eye-bolt 80 having a loop portion 82 and a threaded portion 84 is screwed through this threaded portion into an internally threaded end portion of the inner tubular member 78 opposite to the flattened end portion of the tubular member 76, as seen in FIG. 10. The loop member 82 carries an eye 82a while the flattened portion of the outer tubular member 76 has a longitudinal extension 86 formed with an opening 88, for connection between a suitable stationary member (not shown) of, for example, a vehicle body and an elongated yieldable member (not shown) of a safety harness where the device herein shown is to be incorporated in the safety harness for a motor vehicle.

Figure 13:
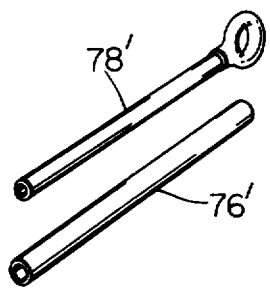
FIG. 13 is a perspective view showing member which are to form the mechanical energy absorbing device illustrated in FIGS. 9 to 11.
Figure 14:
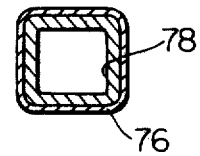
FIG. 14 is a cross sectional view similar to FIG. 12 but now illustrates other preferred cross sections of the members forming the energy absorbing device of the construction shown in FIGS. 9 to 11.

For the formation of the flattened portions of the outer and inner tubular members 76 and 78, respectively, of the mechanical energy absorbing device having the construction above described, pipes 76' and 78' may be first produced, having inside and outside diameters, respectively, which are substantially identical to each other as seen in FIG. 13. The piper 78' having the smaller diameter should then be forced into an axial bore in the pipe 76' having the larger diameter and, thereafter, the outer and inner pipes 76' and 78' thus combined together should be pressed on their longitudinal portions to correspond to the flattened portions of the outer and inner tubular members 76 and 78, respectively, to result.

Where preferred, the second longitudinal portions of the outer and inner tubular members 76 and 78, respectively, which portions have been assumed to be flattened, may have cross sections which are generally rectangular as seen in FIG. 14 or cross sections which are otherwise configured. Whichsoever cross sections may be desired of the first portions of the outer and inner tubuler members 76 and 78, respectively, it is of importance that the first and second portions of the tubular members have cross sections which are different from each other.

Figure 15:
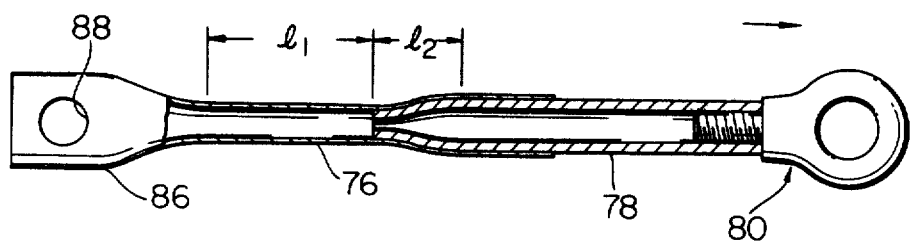
FIG. 15 is a longitudinal sectional view of the energy absorbing device, in an operative condition, of the construction shown in FIGS. 9 to 11.

The outer tubular member 76 is shown to have a wall thickness which is smaller than a wall thickness of the inner tubular member 78 so that the former is less rigid than the latter. This, however, is merely by way of example and, as such, the inner tubular member 78 may be constructed to be less rigid than the outer tubular member 76 or both of the outer and inner tubular members 76 and 78, respectively, may be constructed to be similarly rigid, through selection of the wall thicknesses and/or the materials of the two tubular members.

Where the outer tubular member 76 is constructed to be less rigid than the inner tubular member 78 as illustrated in the drawings, that portion of the outer tubular member 76' which has the circular cross section will be caused to plastically deformed to a configuration substantially identical with the flattened portion of the member 76 as the flattened portion of the inner tubular member 78 is forced away from the initially flattened portion of the outer tubular member 76 as seen in FIG. 15. In FIG. 15, the length $l_1$ indicates a longitudinal portion of the outer tubular member 76 which has been plastically deformed as a result of the passage of the inner tubular member 78 therethrough while the length $l_2$ indicates a longitudinal portion in which the deformation is in process. A kinetic energy longitudinally exerted on the energy absorbing device of the shown construction is in this manner consumed partly in the plastic deformation of the outer tubular member 76 and partly in the generation of heat resulting from the sliding friction caused between the inner and outer surfaces of the outer and inner tubular members 76 and 78, respectively.

Where the inner tubular member 78 is constructed to be less rigid than the outer tubular member 76 as previously mentioned, the inner tubular member 78 will be deformed by the axial movement of the flattened portion of the outer tubular member on and along that portion of the inner tubular member 78 which has initially had the circular cross section. It is apparent that both the outer and inner tubular members 76 and 78, respectively, are deformed as a result of the axial displacement between these members where the two members are constructed to have a substantially common rigidity.

Figure 16:
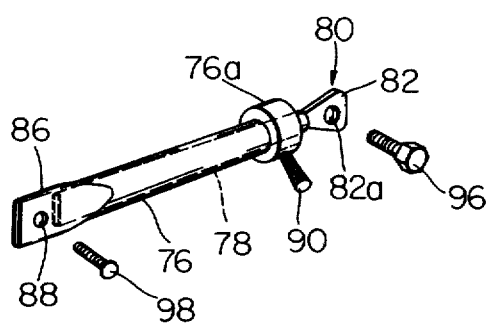
FIG. 16 is a partly exploded perspective view showing a modification of the mechanical energy absorbing device illustrated in FIGS. 9 to 11.

FIG. 16 illustrates a modification of the embodiment of the mechanical energy absorbing device above described. Similarly to the embodiment shown in FIGS. 9 to 15, the device herein shown includes an outer tubular member 76 and an inner tubular member 78 tightly fitted into the former and the outer and inner members 76 and 78, respectively, thus combined together have longitudinally coextensive portions which are flattened toward their ends gradually from the remaining longitudinal portions which have generally circular cross sections. The inner tubular member 78 is connected at its outer end to an eye-bolt 80 and the outer tubular member 76 has a longitudinal extension 86 formed with an opening 88. The mechanical energy absorbing device shown in FIG. 16 includes, in addition to these outer and inner tubular members 76 and 78, respectively, a mounting bolt 90 which is fitted on the end portion of the outer tubular member 76 remote from its flattened portion through, for example, a flange 76a which is formed on a peripheral wall of the outer tubular member.

Figure 17:
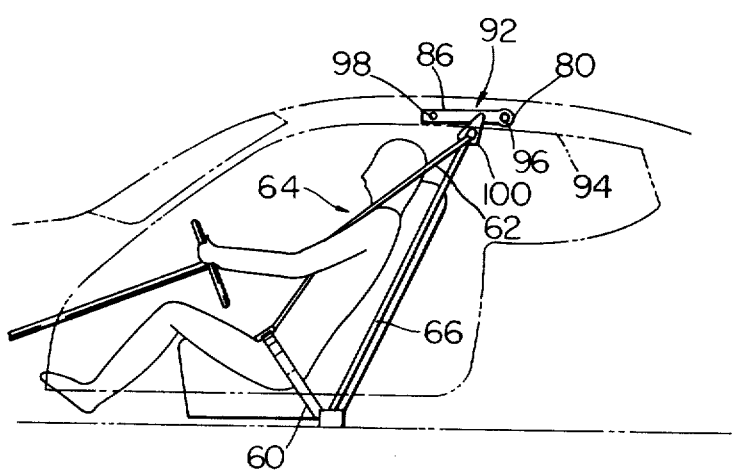
FIG. 17 is a schematic side end view of an example of the safety harness using the mechanical energy absorbing device illustrated in FIG. 16, the safety harness being herein assumed to be mounted on a motor vehicle and being shown to be in an inoperative condition.

The mechanical energy absorbing device thus constructed is mounted on a vehicle body in a manner illustrated in FIG. 17 where the device is to be incorporated in a safety harness for a motor vehicle. Referring also to FIG. 17, the mechanical energy absorbing device, which is now designated in its entirety by reference numeral 92, is secured to any stationary member of a ceiling structure 94 of the vehicle body through an eye 82a in the eye-bolt 80 at one end and the opening 88 in the extension 86 of the outer tubular member 76 at the other end. For this purpose, the eye-bolt 80 is rigidly fastened to the ceiling structure 94 by means of a bolt 96 through the eye 82a in the eye-bolt 80 while the longitudinal extension 86 of the outer tubular member 76 releasably fastened to the ceiling structure 94 by means of a breakable bolt or clip 98 through the opening 88 in the extension 86 (see FIG. 16). The outer tubular member 76 is further connected through the bolt 90 on the flange 76a to a suitable fitting 100 on a shoulder strap 62 of a safety harness. This safety harness is shown as including, in addition to the shoulder strap 62, a seat belt 60 for protecting an occupant 64 of a seat 64, similarly to the safety harness shown in FIGS. 5 and 6.

When, now, the motor vehicle carrying the safety harness of the character above described encounters a frontal collision during cruising, then the occupant 64 of the seat 66 is forced forward to cause the shoulder strap 62 to become taut and appreciably elongated under tension so that the mechanical energy device 92 is urged downward or forced to turn about the bolt 96 which is rigidly secured to the ceiling structure 94. If the mechanical force thus applied to the energy absorbing device 92 is of the order greater than a breaking strength of the breakable bolt or clip 98, then the bolt or clip 98 is torn apart and as a consequence the energy absorbing device 92 in its entirety is permitted to turn about the bolt 96 through the eye 82a in the eye-bolt 80 to a position shown in FIG. 18. The kinetic energy exerted on the shoulder strap 62 is in this manner consumed in a certain proportion in the breakage of the bolt or clip 98. A pull is now given to the energy absorbing device 92 in an axial direction through its connection to the fitting 100 so that the outer and inner tubular members 76 and 78, respectively, are forced in opposite directions. If, under this condition, the mechanical force imparted to the energy absorbing device 92 is greater than an elastic limit of either or both of the tubular members 76 and 78, then either or both of the members will be deformed in its cross section or in their cross sections as the tubular members are moved axially relative to each other. The remaining kinetic energy in the shoulder strap 62 is thus consumed in the elastic deformation of the outer and/or inner tubular members 76 and 78, respectively.

While the inner member to be received in the outer tubular member may be of the tubular configuration as above described especially where the latter is constructed as a deformable member, the inner member may be solid, viz., in the form of a rod if desired; an example of such an arrangement being depicted in FIGS. 19 and 20. As seen in FIGS. 19 and 20, the mechanical energy absorbing device now includes an outer tubular member 76 and an inner solid member 102 which is snugly fitted into an axial bore in the outer tubular member 76. The outer tubular member 76 and inner solid member 102 have first longitudinal portions which merge into second longitudinal portions having cross sections different from those of the first longitudinal portions. For mounting the energy absorbing device in a working place such as on a vehicle body, the outer tubular member 76 has formed at its end a flange 104 having holes 106 through which the flange 104 is rigidly secured to a suitable stationary structural member 108 of the vehicle body by suitable fastening means such as bolts 110 as shown. The inner solid member 102 on the other hand, is fastened to a suitable yieldable member such as a shoulder strap 62 as shown through a substantially rigid bracket 112 which is located adjacent to the flange 110 of the outer tubular member 76. The bracket 112 is rigidly attached at one end to an end of the inner solid member 102 through a bolt 114 which is screwed into the solid member 102 through a hole 112a formed in the end portion of the bracket 112. The bracket 112 is, moreover, fastened at the other end to a loop portion of the shoulder strap 62 through a slot 112b formed in the other end portion of the bracket.

The mechanical energy absorbing device of the construction above described is apparently adapted to have its outer tubular member deformed in its cross section when the inner solid member 102 is forced by the shoulder strap 62 away from the leading end of the outer tubular member 76 so that the mechanical energy exerted on the device is converted partly into energy for causing the plastic deformation of the outer tubular member and partly into energy of frictional heat produced between the outer tubular member 76 and inner solid member 102.

FIG. 21 illustrates a still another modification of the device shown in FIGS. 9 to 11, wherein an inner solid member 102 is constructed to be less rigid than an outer tubular member 76 so that the latter is caused to deform in its cross section when longitudinally moved relative to the former. The device herein shown may be mounted in a working position through a flange 110 which is formed on the outer tubular member 76 similarly to the embodiment shown in FIGS. 19 and 20.

While inner and outer members of the embodiments thus far described with reference to 9 to 21 have been assumed to have the first and second longitudinal portions which are different in cross section, the inner and outer members may further have third longitudinal portions which have cross sections differing from the cross sections of the first and/or second longitudinal portions of the members, where desired.

Because of the fact that the embodiments of the mechanical energy absorbing device above described are essentially comprised by pipes or combinations of pipes and rods, simplicity of construction is achieved so that space requirement is alleviated especially where only limited spaces are available for the installation of the devices and that the production costs are significantly reduced. The energy absorbing devices will, moreover, permit total inspection for quality control purposes during production because the members making up the devices can be readily moved relative to each other through prescribed lengths.

Figure 22:
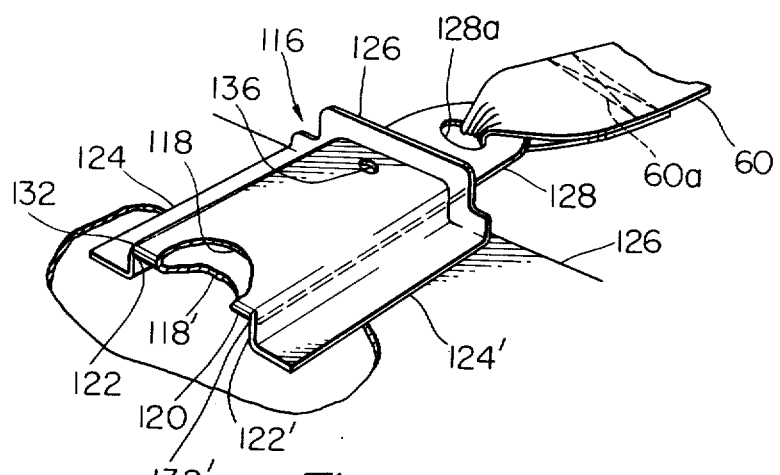
FIG. 22 is a partly exploded perspective view showing still another preferred embodiment of the mechanical energy absorbing device according to the present invention, the device being illustrated to be in an inoperative condition.
Figure 23:
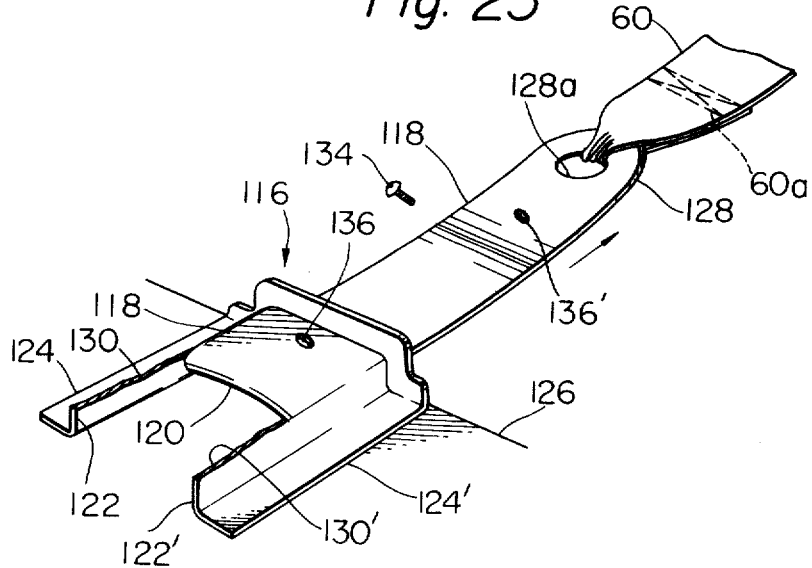
FIG. 23 is also a partly exploded perspective view of the energy absorbing device of FIG. 22, the device being shown to be in an operative condition.

FIGS. 22 and 23 illustrate still another preferred embodiment of the mechanical energy absorbing device according to the present invention. The energy device herein shown comprises a unitary structure 116 having upper and lower elongated wall portions 118 and 118', respectively, which are spaced apart from and substantially in parallel to each other and which merge into each other through a return-end portion 120. The upper elongated wall portion 118 is integral through its longitudinal edges with reinforcement wall portions 122 and 122' which are normal or otherwise angled to the elongated wall portions 118 and 118'. These reinforcement wall portions 122 and 122', in turn, are integral with side flanges 124 and 124', respectively, which are welded, bolted or otherwise rigidly fastened to any suitable stationary member 126. The lower elongated wall portion 118' thus extends between the overlying upper elongated wall portion 118 and a surface of the underlying stationary member 126 and longitudinally projects outwardly. At an edge of the structure 116 remote from the return-end portion 122 is formed a cross reinforcement wall portion 126 which is integral with the upper elongated wall portion 118, side reinforcement wall portions 122 and 122' and side flanges 124 and 124' and which extend away from the underlying lower elongated wall portion 118'. The lower elongated wall portion 118' has a longitudinal extension 128 which has formed therein a slot 128a. Where the mechanical energy absorbing device thus constructed is to be incorporated in a safety harness of the previously described character, the lower elongated wall portion 118' of the structure 116 is connected to a seat belt 60, for example, through the slot 128a in the extension 128 and through a loop portion of the belt which is stitched as at 60a.

When, now, the lower elongated wall portion of the structure 116 is forced in a direction indicated by arrow in FIG. 23, viz., away from the return-end portion 122 initially formed, a mechanical stress will be produced at the return-end portion 120 intermediate between the elongated wall positions 118 and 118'. If, in this instance, the mechanical stress thus produced at the return-end portion 120 is of the order greater than a breaking strength of the structure 116, then the upper elongated wall portion 118 will be longitudinally severed from the side reinforcement wall portions 122 and 122' along edges 130 and 130' at which the upper elongated wall portion 118 parts from the reinforcement wall portions, as will be clearly seen in FIG. 23. As the upper elongated wall portion 118 is torn apart from the structure 116 in this manner, the return-end portion 122 will continuously moved away from its initial position toward the front reinforcement wall portion 126. As a consequence, the mechanical energy exerted on the structure 126 is consumed partly in the shear of the upper elongated wall portion 118 from the side reinforcement wall members 122 and 122' and partly in the plastic deformation of the upper elongated wall member 118 at the return-end portion 120 moving toward the front cross reinforcement wall portion 126. The side reinforcement wall portions 122 and 122' and the front cross reinforcement wall portion 126 serve to prevent excessive or undesired deformation of the structure 116 in its entirety.

To aid in the shear of the upper elongated wall portion 118 from the side reinforcement wall portions 122 and 122' at an incipient stage of the severance, suitable stress rising means may be provided at the return-end portion 120 initially formed. The stress rising means of this nature may comprise notches or openings 132 and 132' which are formed at sidewise ends of the return-end portion 120, viz., between the lateral ends of the upper elongated wall portion 118 and the adjacent side reinforcement wall portions 122 and 122', as seen in FIG. 22.

The structure 116 may be, moreover, provided with suitable mechanical resistance means which is adapted to provide an additional resistance to the mechanical force applied to the structure. Such mechanical resistance means may comprise a breakable bolt or clip 134 which passed through holes 136 and 136' formed in the upper and lower elongated wall portions 118 and 118', respectively. These holes 136 and 136' are aligned with each other in an initial condition of the structure 116 and receive therein the bolt or clip 134 which thus fasten the upper and lower elongated wall portions 118 and 118', respectively, to each other. When the lower elongated wall portion 118' is pulled away from the return-end portion 120 as above discussed, an internal stress is produced in the bolt or clip 134 and is consequently broken or removed from the structure 116 so that the mechanical force is now imparted to the return-end portion 120 between the upper and lower elongated wall portions 118 and 118', respectively.

The embodiment shown in FIGS. 22 and 23 is made up of only of the unitary structure and, thus, features simplicity of construction advantageous for ease of production and for reduction of the production cost and space requirement in mounting the structure in a working place.

It will now be appreciated from the foregoing description that the mechanical energy absorbing device according to the present invention has an increased energy absorption efficiency and capable of responding to an impact at a proper timing. The safety harness using the mechanical energy absorbing device having these features will therefore provide reliability in the protection of the occupant of a seat from impact especially where the safety harness is used in a motor vehicle or air plane.

What is claimed is:

1. In a safety harness, a mechanical energy absorbing device comprising an elongated casing having a rigid construction, said elongated casing having two spaced, substantially parallel inner surfaces which face with each other; and a deformable strip of substantially U-shaped form disposed between said two inner surfaces, said strip having one leg and other leg which is rigidly secured at an end portion thereof to the adjacent surface of one of said two inner surfaces; said mechanical energy absorbing device being connected to the safety harness so that a tension force is applied between said elongated casing and said one leg of said deformable strip, said one leg being formed at both sides thereof with guide flanges extending between said two surfaces.

2. A mechanical energy absorbing device as claimed in claim 1, further comprising at least one bolt rigidly securing said other leg to the adjacent inner surface.

* * * * *